(12) United States Patent
Fukushima (10) Patent No.: US 6,546,961 B2
(45) Date of Patent: Apr. 15, 2003

(54) INTEGRATED GAS CONTROL DEVICE

(75) Inventor: Yoshitomo Fukushima, Yabuzuka Honmachi (JP)

(73) Assignee: Kitz SCT Corporation, Tokyo (JP)

( * ) Notice: Subject to any disclaimer, the term of this patent is extended or adjusted under 35 U.S.C. 154(b) by 73 days.

(21) Appl. No.: 09/915,299

(22) Filed: Jul. 27, 2001

(65) Prior Publication Data

US 2002/0017329 A1 Feb. 14, 2002

(30) Foreign Application Priority Data

Aug. 1, 2000 (JP) .................................... 2000-233756

(51) Int. Cl.⁷ ................................................ F16K 11/10
(52) U.S. Cl. ....................................................... 137/884
(58) Field of Search ................................ 137/269, 270, 137/271, 597, 884

(56) References Cited

U.S. PATENT DOCUMENTS

| | | | | | |
|---|---|---|---|---|---|
| 5,988,217 | A | * | 11/1999 | Ohmi et al. | 137/614.2 |
| 6,039,360 | A | * | 3/2000 | Ohmi et al. | 285/61 |
| 6,116,282 | A | * | 9/2000 | Yamaji et al. | 137/884 |
| 6,216,739 | B1 | * | 4/2001 | Fukushima et al. | 137/884 |

* cited by examiner

*Primary Examiner*—John Fox
(74) *Attorney, Agent, or Firm*—Dennison, Schultz & Dougherty (57) ABSTRACT

An integrated gas control device has an elongated base having a pair of ribs longitudinally extending on the base to form a groove there-between. A plurality of passage blocks are mounted in the groove. Each of the passage blocks has a gas passage having openings opened at an upper surface at both ends of the block. A plurality of gas control equipments are mounted on adjacent passage blocks. Each of the gas control equipments is installed on the base.

12 Claims, 12 Drawing Sheets

INTEGRATED GAS CONTROL DEVICE

BACKGROUND OF THE INVENTION

The present invention relates to an integrated gas control device integrated on a base, which is used in a manufacturing factory such as a semiconductor manufacturing factory.

There is known three kinds of integrated gas control device as the semiconductor manufacturing device.

In the first kind of integrated gas control device, plural kinds of gas control equipments are connected by joints and pipes in series to form a gas control line. A plurality of gas control lines are disposed in parallel to provide an integrated device.

In the second kind of gas control device, passage blocks are securely mounted on a base plate, and gas control equipments are mounted on a passage blocks, interposing sealing members. A gas passage of the passage block is communicated with a passage of the gas control equipment, and the gas control equipments are removably connected to the passage blocks to provide a gas control line. A plurality of gas control lines are arranged in parallel and integrated into a panel.

The third device is disclosed in U.S. Pat. No. 6,216,739 which was filed by the present patent applicant. In the device, blocks of gas control equipment and passage blocks are combined and mounted on a base plate. A cylindrical portion of the gas control block is engaged with a cylindrical body of the gas control equipment.

In the first device, since a plurality of gas control equipments are connected, the length of the gas control line increases. Since it is difficult to remove the gas control equipment from the control device and to assemble a new gas control equipment on the device, the manufacturing cost of the gas control device increases, and the exchange of the equipment is impossible. Furthermore, welding fumes and particles are generated at the manufacturing of the device, which renders the device fragile at the welding portion to shorten the life of the pipe.

Since, in the second device, gas control equipments are installed on passage blocks arranged on a base plate, the gas control device is reduced in inside capacity. Furthermore, it is possible to elongate the life of the device because the welding fumes do not generate.

Since the gas control equipment can easily be removed from the passage blocks, it is possible to exchange the gas control equipment with a new equipment. Therefore, maintenance cost can be reduced.

However, in the second device, the gas control equipment and the passage block are connected through an O-ring, which causes irregular fastening to reduce the reliability of the device.

In the third device, the gas control equipment is combined with passage blocks and mounted on a block. Therefore, the third device has the same advantages as the second device.

Furthermore, a union nut provided on a periphery of a body of the gas control equipment is engaged with a screw thread formed on a periphery of a cylindrical portion of an installing block for the gas control equipment, thereby connecting the equipment with passage blocks. Therefore, gas control equipments are installed in good balance condition, ensuring complete sealing.

However, in the third device, the shape of the body of the gas control equipment is limited to a cylindrical form. Consequently, the gas control equipment having a flange or a projected block can not be used in the device.

SUMMARY OF THE INVENTION

An object of the present invention is to provide a gas control device which may be reduced in size, may increase the reliability of the device, and use a gas control equipment having a flange or projected block.

According to the present invention, there is provided an integrated gas control device comprising an elongated base having a pair of ribs longitudinally extending on the base to form a groove there-between, a pair of end passage blocks mounted in the groove at both ends thereof, each of the end passage blocks having a gas passage having an opening opened at an upper surface at an inner portion of the block, intermediate passage blocks mounted in the groove between the end passage blocks, each of the intermediate passage blocks having a gas passage having openings opened at an upper surface at both ends of the block, a plurality of gas control equipments, each of the gas control equipments being mounted on adjacent passage blocks, and having a pair of gas passages having openings communicated with the gas passages of the adjacent passage blocks, a plurality of installing devices, for installing the gas control equipments on the base, respectively.

The gas passage of each of the end passage blocks has an opening at an axial end side.

One of the gas control equipments has a body mounted on the adjacent passage blocks, and the body has a pair of gas passages communicated with gas passages of the adjacent passage blocks.

The opening of the gas passage is surrounded by an annular projection.

The installing devices comprises a supporting base having a cylindrical portion having a screw thread formed on the cylindrical portion, and secured to the base, and a union nut engaged with the screw thread for installing the gas control equipment.

In another aspect of the invention, one of the gas control equipments has a pair of projecting blocks mounted on adjacent passage blocks, and each of the projecting blocks has a gas passage communicated with the gas passage of the corresponding passage block.

Furthermore, the body has a flange, one of the installing devices comprises a supporting base having a cylindrical portion having a screw thread formed on the cylindrical portion, and secured to the base, and a union nut engaged with the screw thread and engaged with the flange of the body so that the body is pressed against adjacent passage blocks.

Four pillars are engaged with threaded holes formed in the ribs for nipping the projecting blocks, and a pair of cramping blocks are provided for pressing the projecting blocks against the adjacent passage blocks.

The pillar has a supporting portion having a smaller diameter than that of the body portion of the pillar and a head at an upper end of the supporting portion, the cramping blocks has a pair of grooves slidably engaged with the supporting portion, and a threaded hole in which a screw is engaged, the cramping block is pressed against a jaw of the head and a lower end of the screw is pressed against the projecting block.

These and other objects and features of the present invention will become more apparent from the following detailed description with reference to the accompanying drawings.

DETAILED DESCRIPTION OF THE PREFERRED EMBODIMENT

Figure 1:
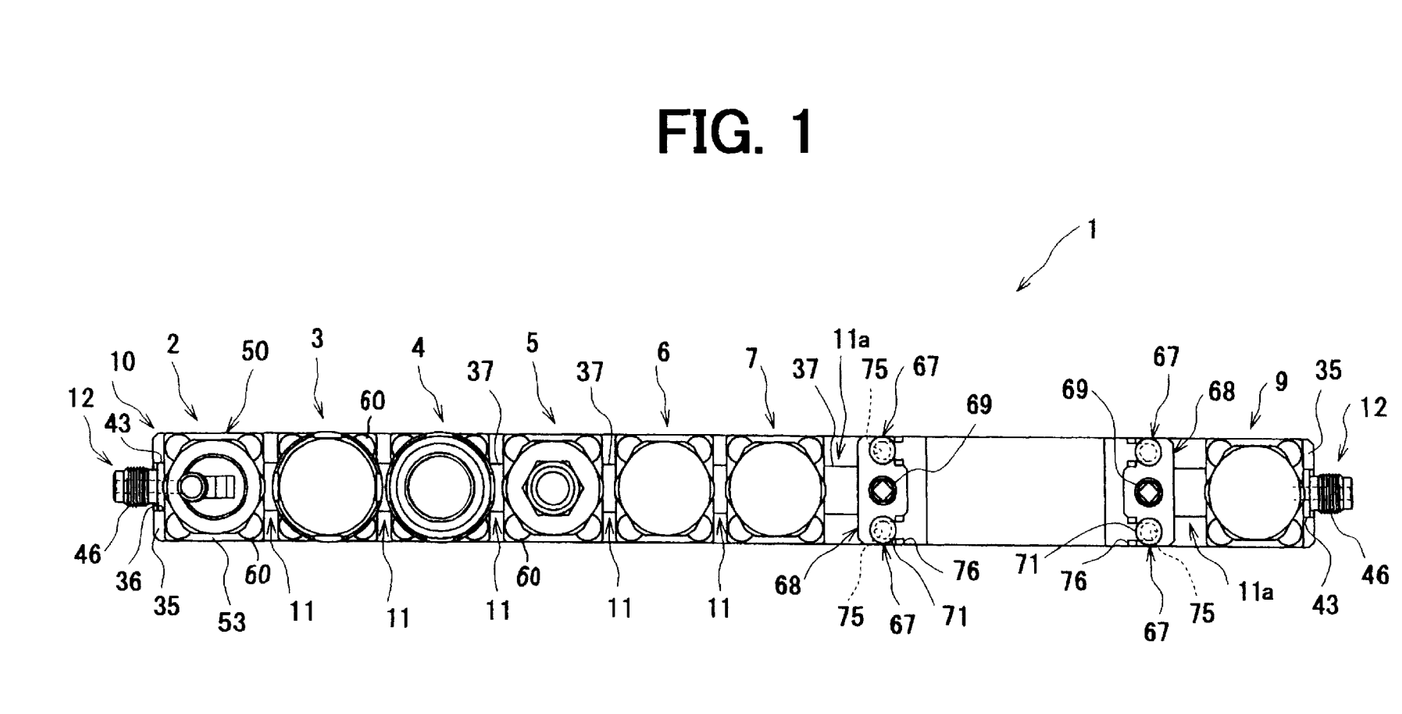
FIG. 1 is a plan view of an integrated gas control device according to the present invention.
Figure 2:
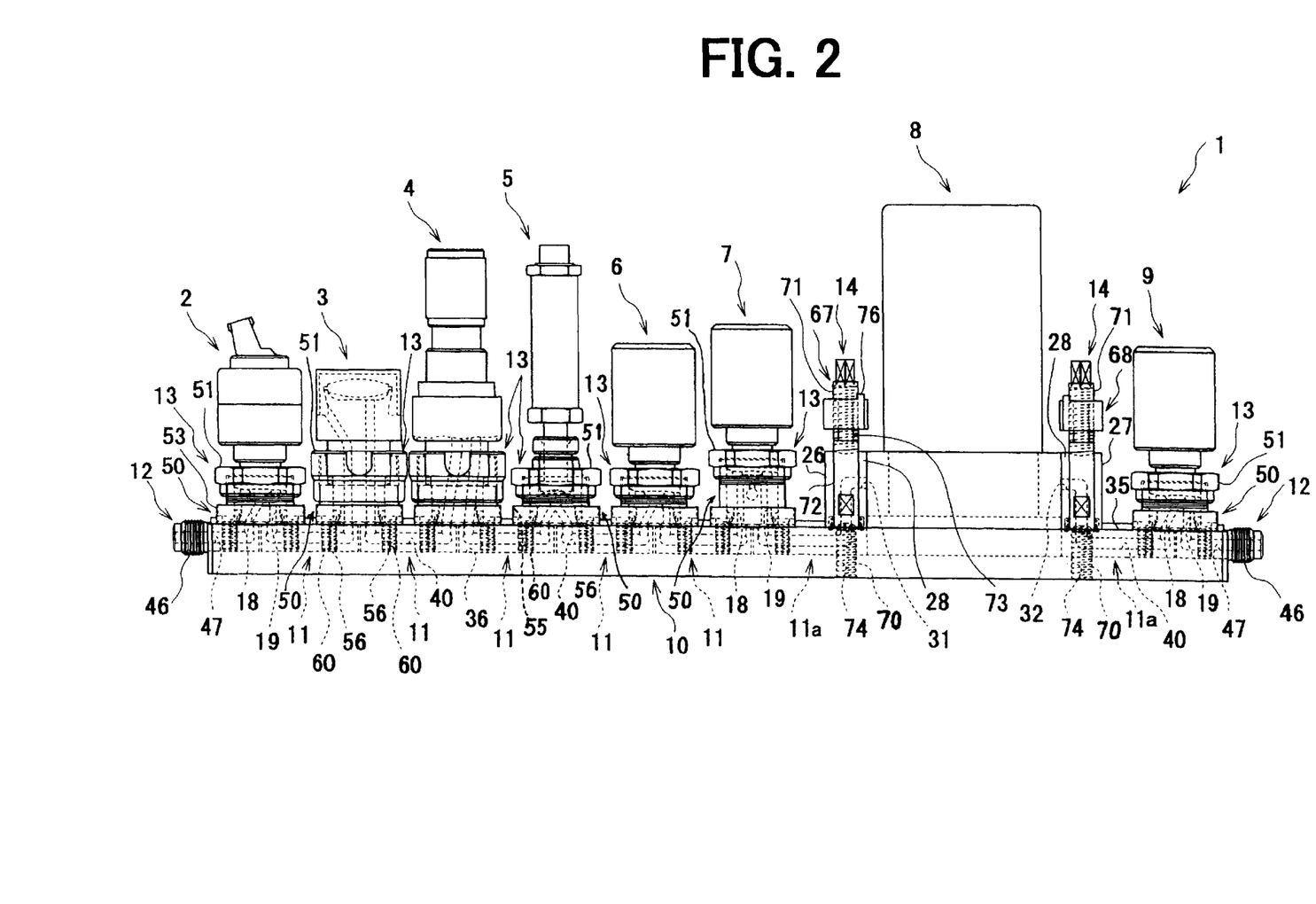
FIG. 2 is a front view of the gas control device.

Referring to FIGS. 1 and 2, an integrated gas control device 1 comprises a plurality of gas control equipments comprising a toggle type manual diaphragm valve 2 for closing a gas passage, a filter unit 3 for removing impurities included in gas, a regulator 4 for regulating the pressure of gas, a pressure transducer 5 for detecting the pressure of gas, an automatic diaphragm valve 6 for closing the gas passage, a purge valve 7 for supplying purge gas, a mass flow controller 8 for controlling the flow rate of gas, an automatic diaphragm valve 9 for closing the gas passage. These gas control equipments are connected to each other, and detachably mounted on intermediate passage blocks 11, 11a and end passage blocks 12 on an elongated base 10 made of stainless steel by installing devices 13 and 14.

Figure 3:
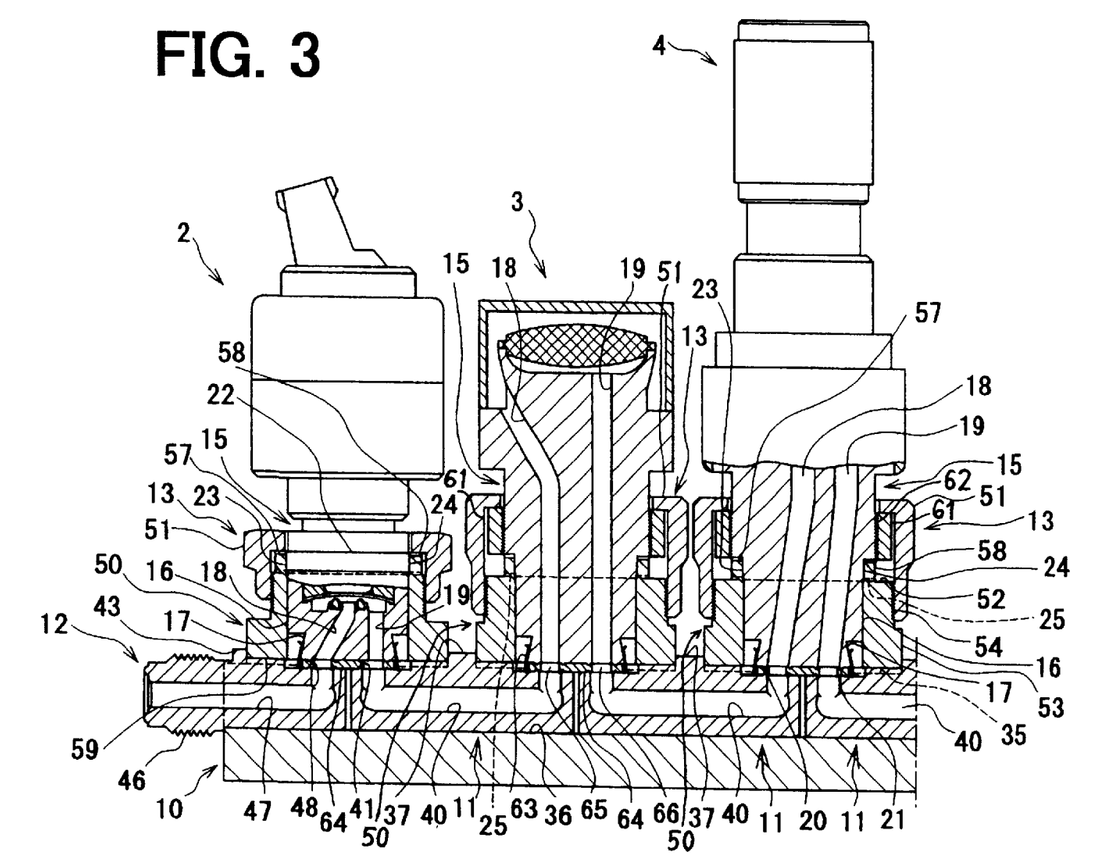
FIG. 3 is a partial sectional view of a left side portion of the gas control device.
Figure 4:
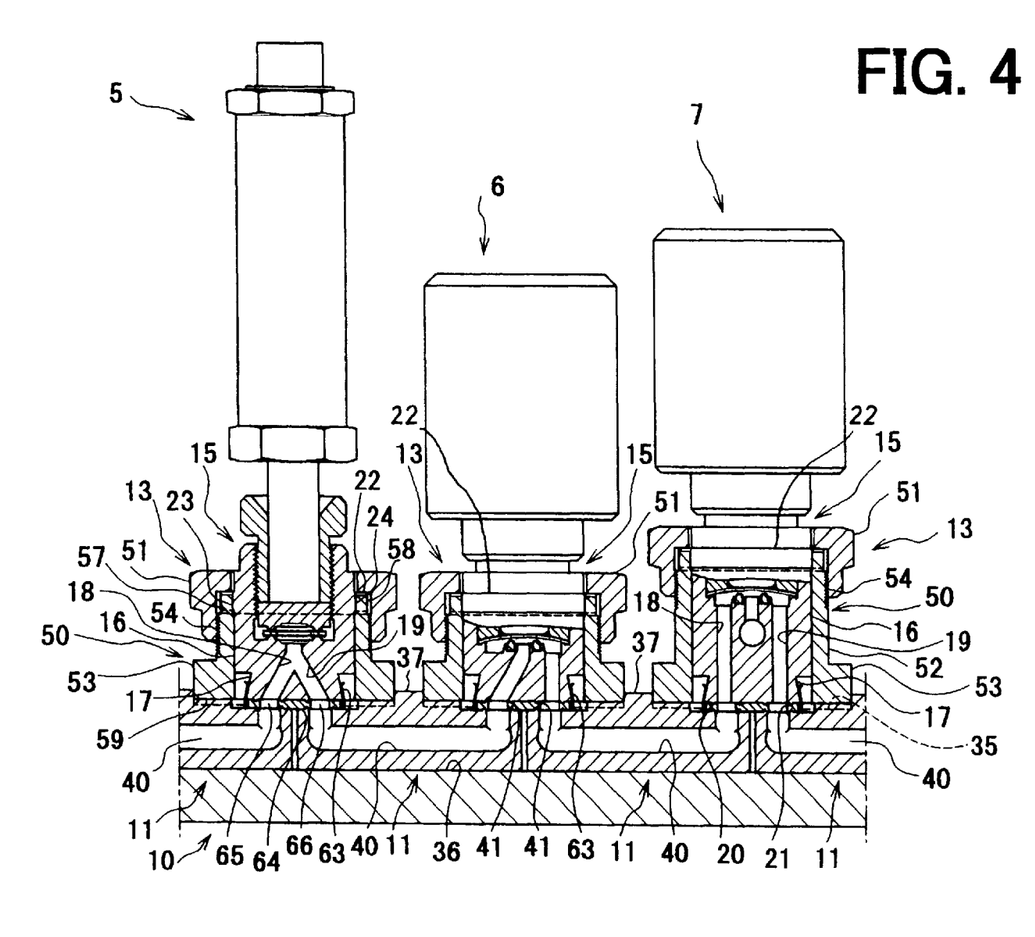
FIG. 4 is a partial sectional view of a central portion of the gas control device.
Figure 5:
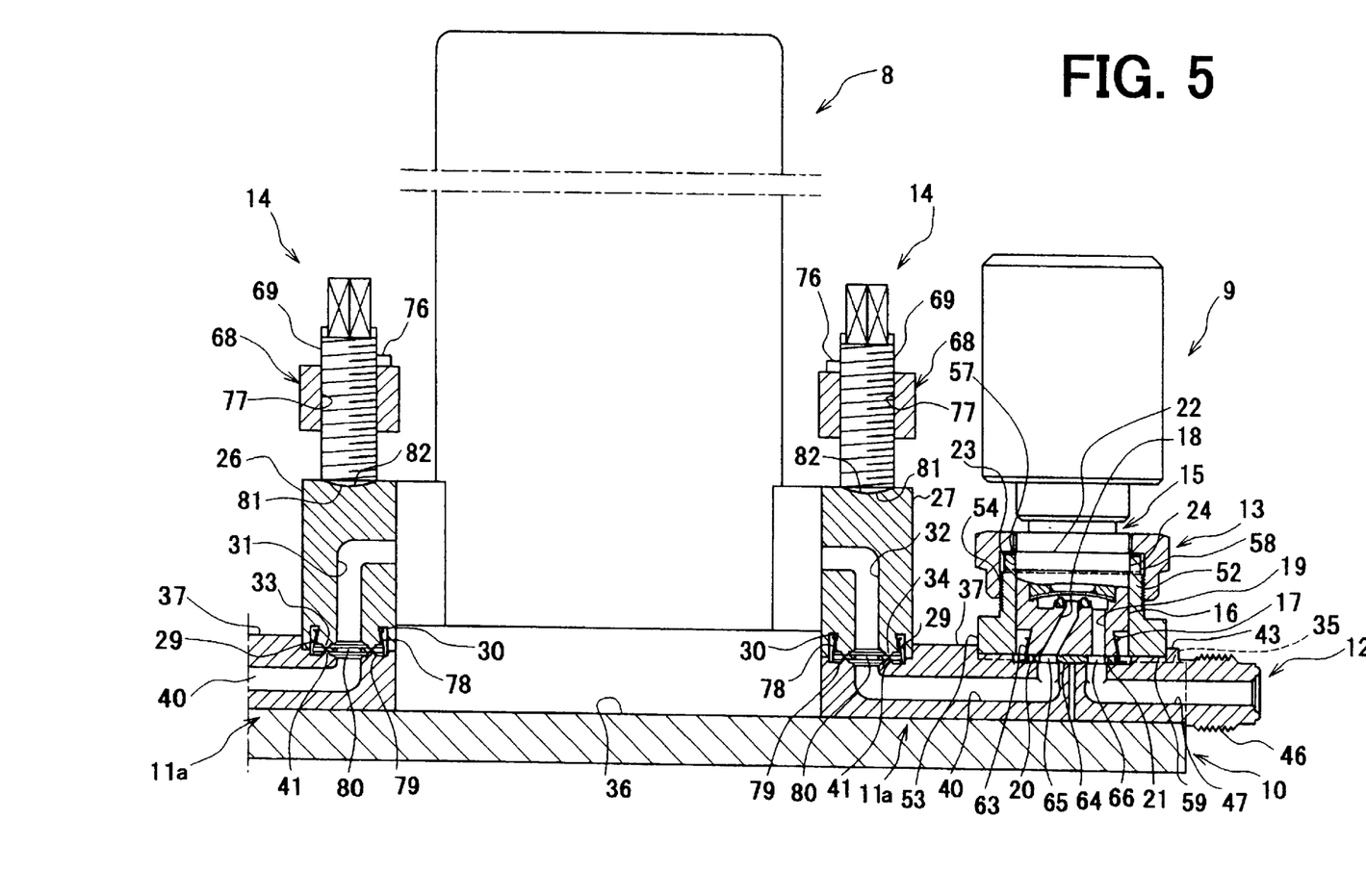
FIG. 5 is a partial sectional view of aright side portion of the gas control device.

As shown in FIGS. 3, 4 and 5, each of the manual diaphragm valve 2, filter unit 3, regulator 4, pressure transducer 5, automatic diaphragm valve 6, purge valve 7, mass flow controller 8 and automatic diaphragm valve 9 is assembled as a unit and detachably mounted on the intermediate passage block 11, 11a or end passage block 12 and secured to the base 10 by the installing device 13 or 14. Further, each of the diaphragm valve 2, filter unit 3, regulator 4, pressure transducer 5, automatic diaphragm valve 6, purge valve 7 and automatic diaphragm valve 9 has a body 15.

Hereinafter, members each having the same function as other members are identified by the same reference numerals.

Each of the bodies 15 has a cylindrical portion 16 having a substantially same diameter as others. Under the cylindrical portion 16, a parallelepiped portion 17 is formed. In each of the bodies 15, a first gas passage 18 and a second gas passage 19 are formed. The upper end of each gas passage is opened to a function portion, and the lower end is opened to the underside of the body. Each of the lower end openings of the gas passages 18 and 19 has the same diameter as the other and is disposed at a position having the same distance from the axis as the other. On the circular surfaces of the lower end openings of the gas passages 18 and 19, annular sealing projections 20 and 21 are formed for sealing the passages. Each of the annular projections 20 and 21 has a triangular section having an acute angle top.

On an upper periphery of the body 15 of each of the manual diaphragm valve 2, pressure transducer 5, automatic diaphragm valve 6, purge valve 7 and automatic diaphragm valve 9, a flange 22 is formed. On the periphery of the flange 22, positioning notches 23, 24 are formed at opposite positions. On a stepped portion 25 at an intermediate position of each of the filter unit 3 and regulator 4, positioning notches 23 and 24 are formed at opposite positions.

Figure 7:
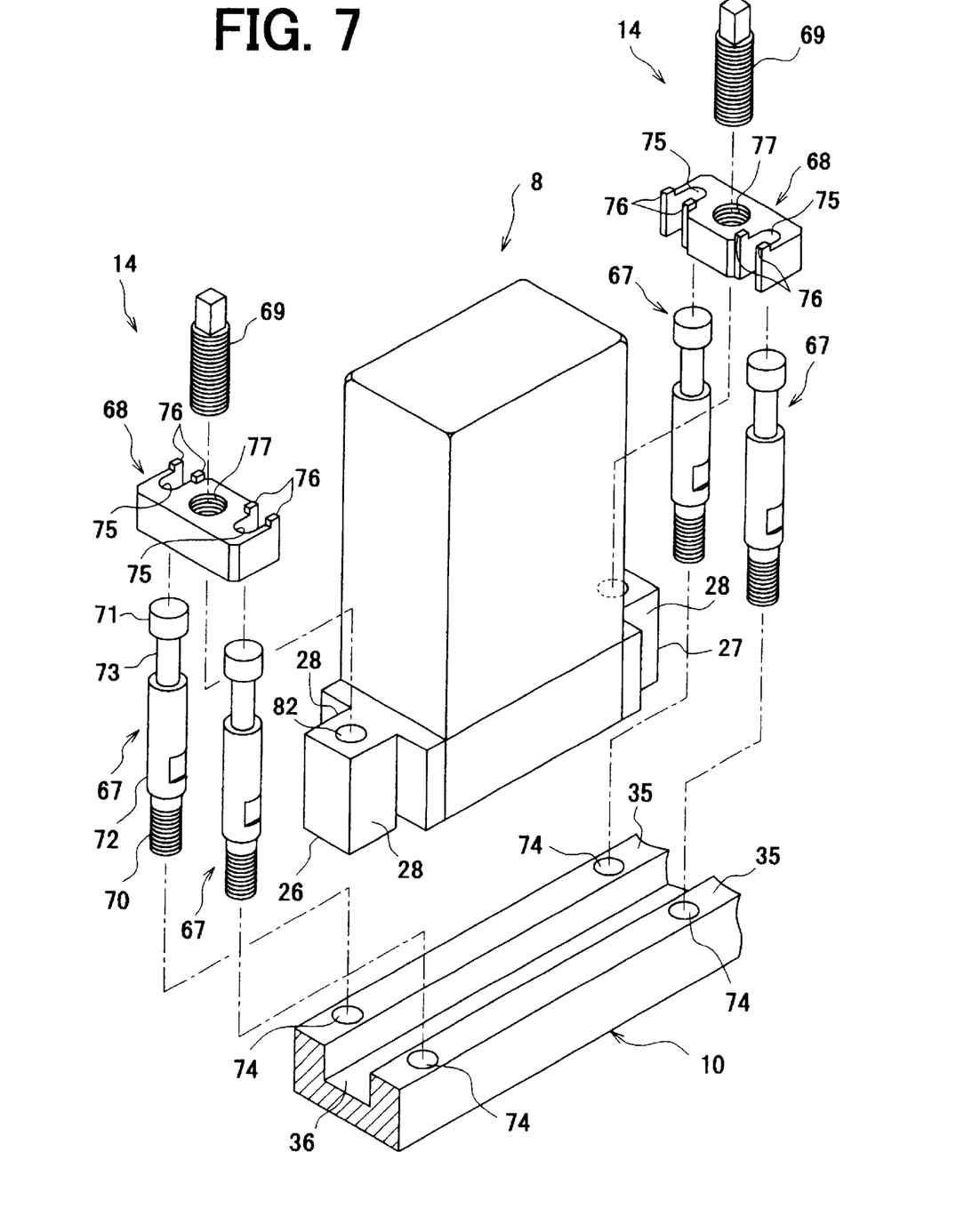
FIG. 7 is an exploded perspective view of another part of the gas control device.
Figure 8:
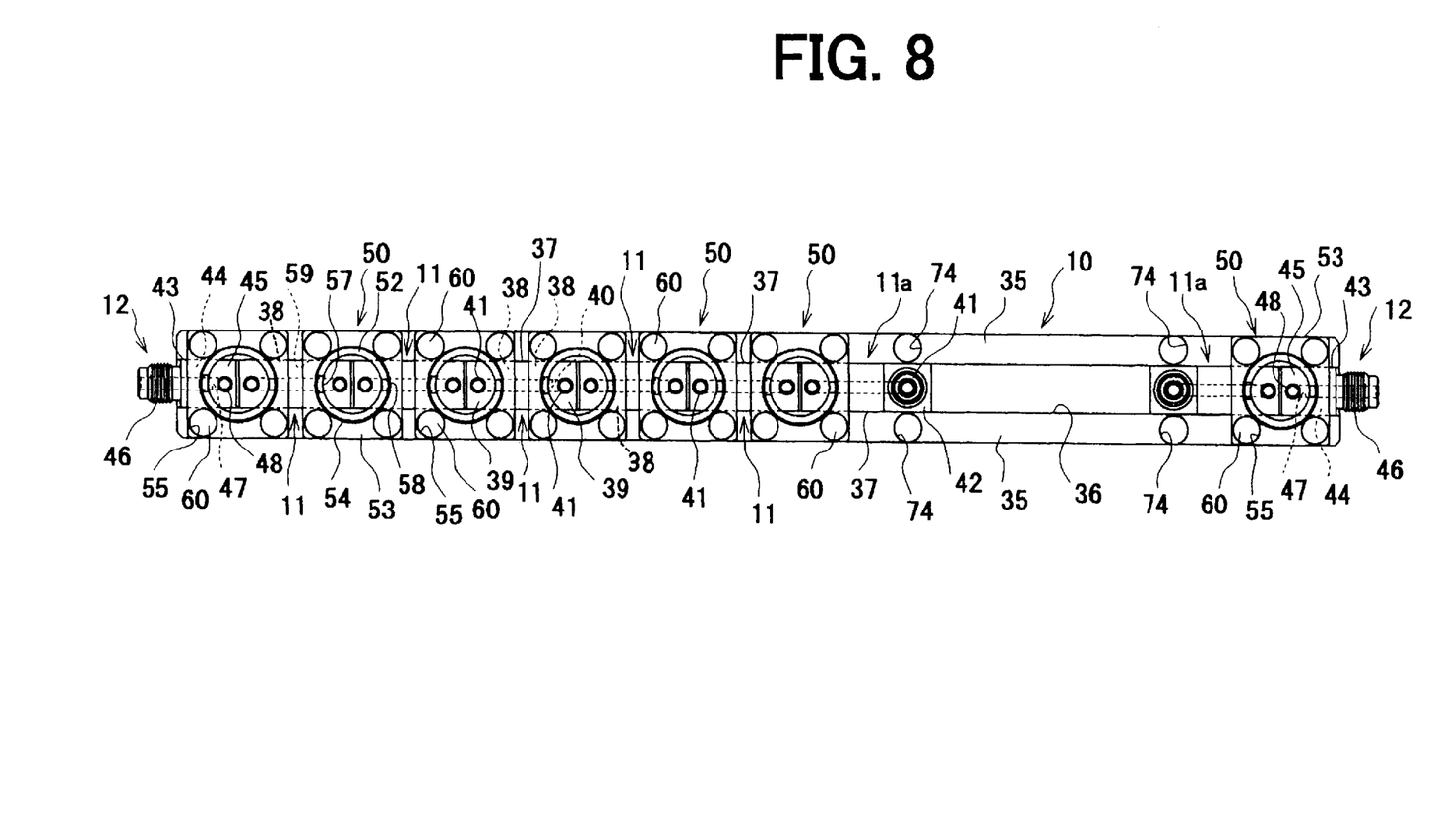
FIG. 8 is a plan view of the gas control device except for gas control equipments.

Referring to FIG. 7, the mass flow controller 8 has a pair of projecting blocks 26 and 27 at opposite sides of a lower end portion, each having a narrow engaging portion 28. As shown in FIG. 5, at the bottom of each engaging portion 28, a cylindrical portion 30 is formed by a circular groove 29. In the projecting blocks 26 and 27, there is formed a first gas passage 31 and a second gas passage 32. The upper end of each gas passage 31 (32) is communicated with an upper function device, and the lower end of the gas passage is opened at the bottom in the cylindrical portion 30. On the bottom of the engaging portions 28, circular sealing projections 33 and 34 are formed surrounding the openings of the gas passages 31 and 32.

Figure 6:
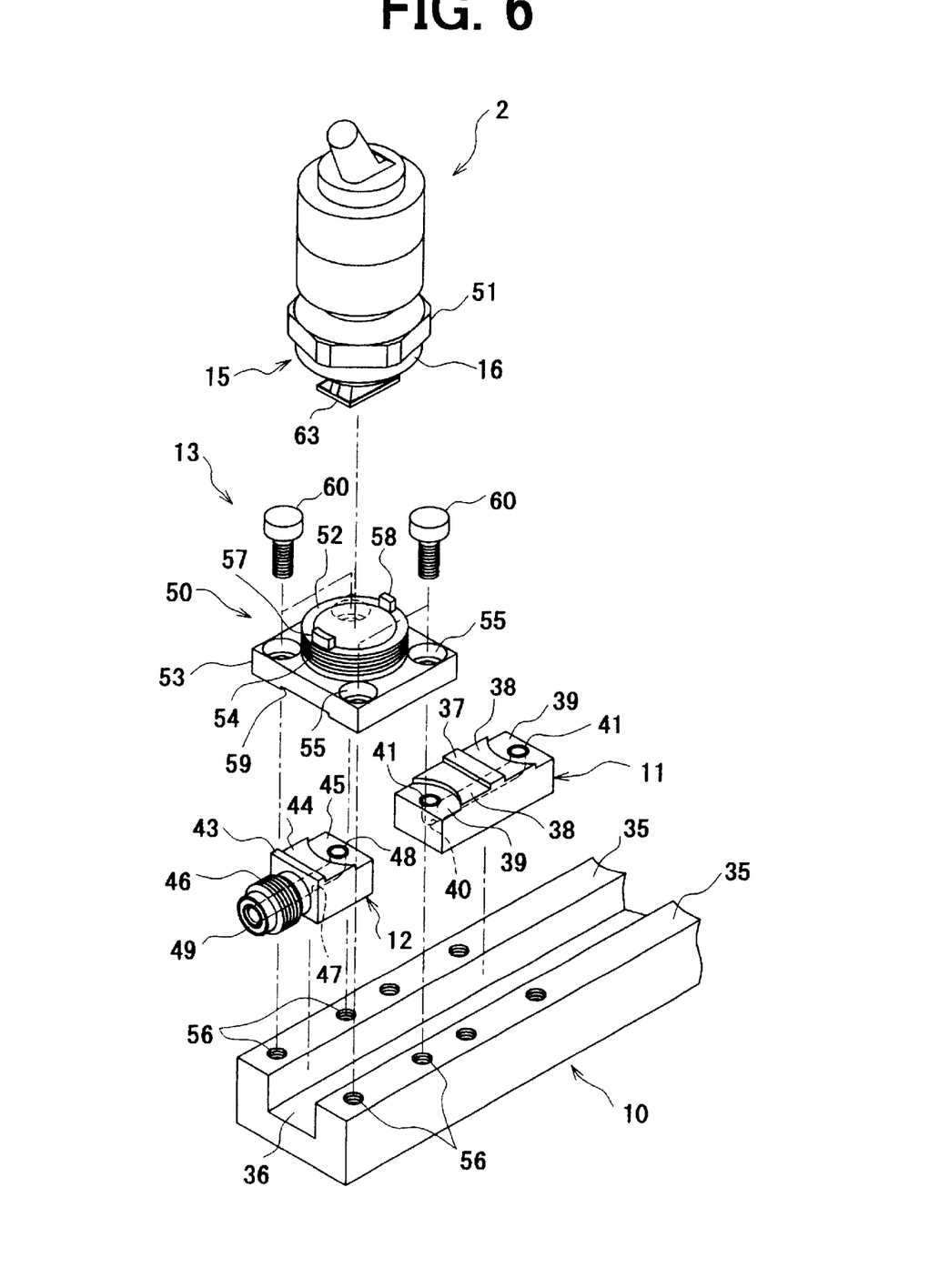
FIG. 6 is an exploded perspective view of a part of the gas control device.

Referring to FIGS. 6 and 7, a groove 36 is formed on the base 10 by a pair of ribs 35.

Each of the intermediate passage blocks 11 provided between the toggle type manual diaphragm valve 2 and the filter unit 3, between the filter unit 3 and the regulator 4, between the regulator 4 and the pressure transducer 5, between the pressure transducer 5 and the automatic diaphragm valve 6, and between the automatic diaphragm valve 6 and the purge valve 7 has the same shape and construction.

Figure 9A:
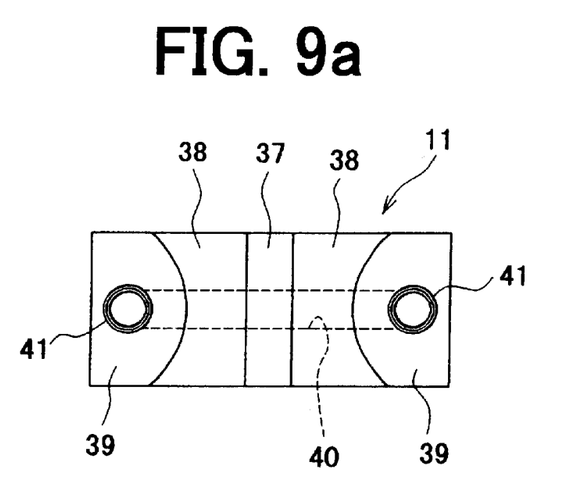
FIG. 9a is a plan view of an intermediate passage block.
Figure 9B:
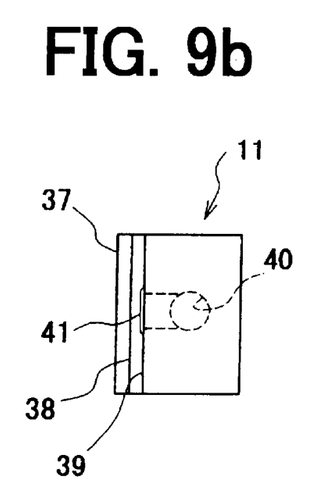
FIG. 9b is a right side view of the intermediate passage block.
Figure 9C:
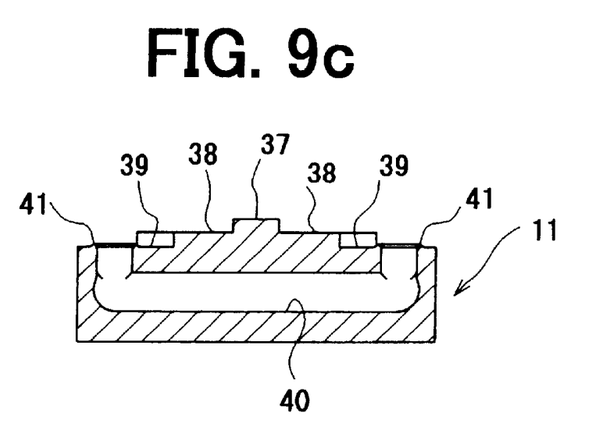
FIG. 9c is a sectional view of the intermediate passage block.

Referring to FIGS. 9a, 9b and 9c, the intermediate passage block 11 has a rectangular parallelepiped shape having a width engageable with the groove 36 of the base 10. A positioning projection 37 is formed on the top of the passage block 11 at a central portion thereof, providing positioning engaging portions 38 on both sides of the positioning projection 37. A connecting portion 39 having an arcuated inner wall is formed in each engaging portion 38. A gas passage 40 is formed in the passage block 11. Both ends of the gas passage 40 are opened at the connecting portions 39. A circular projection 41 is provided on the connecting portion 39, surrounding the opening of the gas passage 40. The height of the positioning engaging portion 38 is set to a value so that the top of the engaging portion 38 projects from the rib 35 when the passage block 11 is engaged in the groove 36 as shown in FIGS. 3 to 5.

Figure 10A:
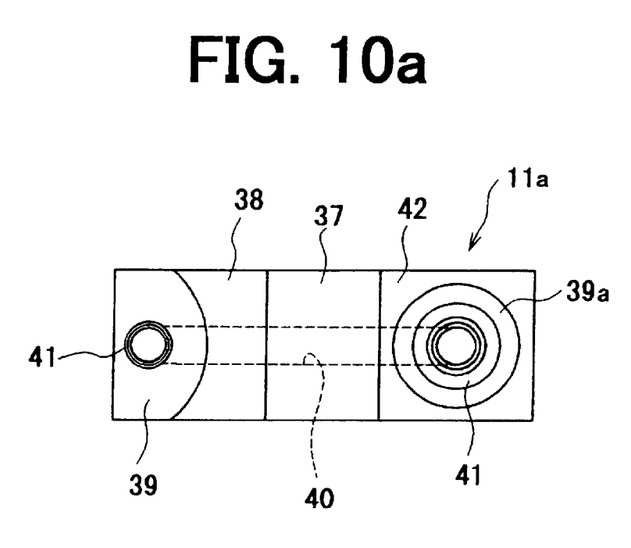
FIG. 10a is a plan view of another intermediate passage block.
Figure 10B:
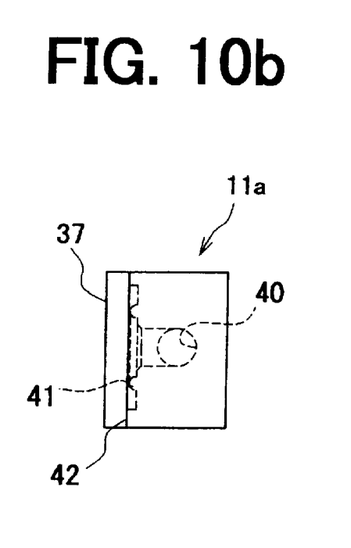
FIG. 10b is a right side view of the intermediate passage block.
Figure 10C:
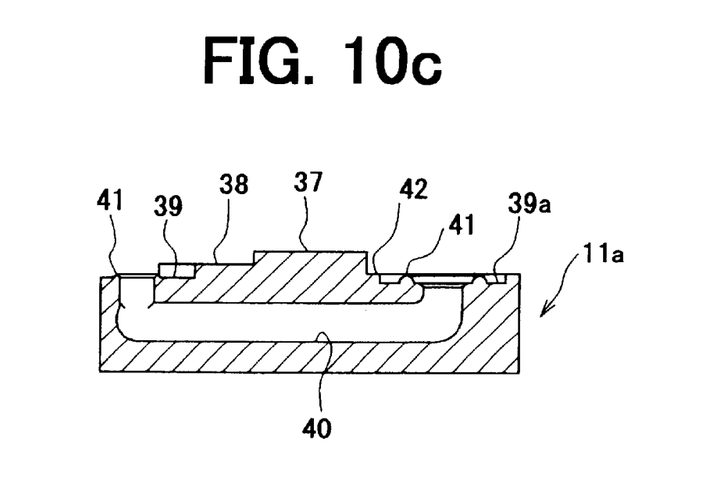
FIG. 10c is a sectional view of the intermediate passage block.

FIGS. 10a to 10c show the passage block 11a provided between the purge valve 7 and the mass flow controller 8, and between the mass flow controller 8 and the automatic diaphragm valve 9. The positioning engaging portion 38 is formed only at one side of the passage block 11a. On the other side, a mounting surface 42 is provided on which projecting block 26 or 27 of the mass flow controller 8 is to be mounted. An annular recess 39a is formed in the mounting surface 42. The height of the mounting surface 42 is slightly lower than the positioning engaging portion 38 and slightly higher than the circular sealing projection 41. Other parts are the same as those of FIGS. 9a to 9c. The height of the positioning engaging portion 38 is set to a value so that the top of the engaging portion 38 projects from the rib 35 when the passage block 11a is engaged in the groove 36 as shown in FIGS. 3 to 5.

Figure 11A:
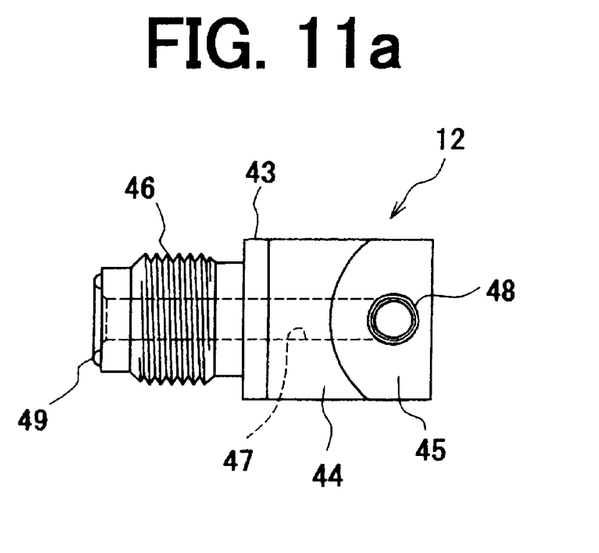
FIG. 11a is a plan view of an end passage block.
Figure 11B:
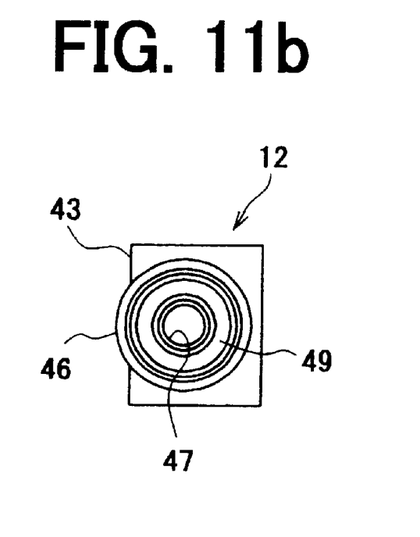
FIG. 11b is a left side view of the end passage block.
Figure 11C:
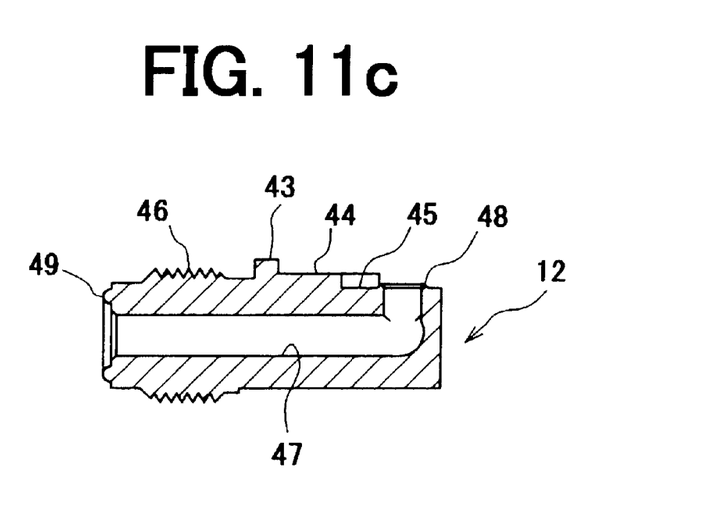
FIG. 11c is a sectional view of the end passage block.

Referring to FIGS. 11a to 11c, the end passage block 12 has a rectangular parallelepiped portion at an end portion, having a width engageable with the groove 36 of the base. At the other end portion, a cylindrical portion is formed. A positioning projection 43 is formed on the top of the rectangular parallelepiped portion of the block 12. At a side of the positioning projection 43, a positioning engaging portion 44 and a connecting portion 45 are stepwise formed. A screw thread 46 is formed on the cylindrical portion so as to be connected with another device.

In the end passage block 12, a gas passage 47 is formed. One of ends of the gas passage 47 is opened at the connecting portion 45. A circular sealing projection 48 is provided on the connecting portion 45 around the opening of the gas passage. The circular sealing projection 48 is lower than the positioning engaging portion 44. A circular sealing projection 49 is formed on the end of the cylindrical portion around the opening of the gas passage 47.

Another end of the gas passage 47 is opened at an axial end side of the cylindrical portion. The heights of the positioning projections 37 and 43, heights of positioning engaging portions 38 and 44, heights of connecting portions 39 and 45, and circular sealing projections 41 and 48 are set to be equal respectively.

Referring to FIGS. 3 to 6, installing device 13 for the manual diaphragm valve 2, filter unit 3, regulator 4, pressure transducer 5, automatic diaphragm valve 6, purge valve 7 and automatic diaphragm valve 9 comprises a supporting base 50 and union nut 51 made of stainless steel.

Figure 12A:
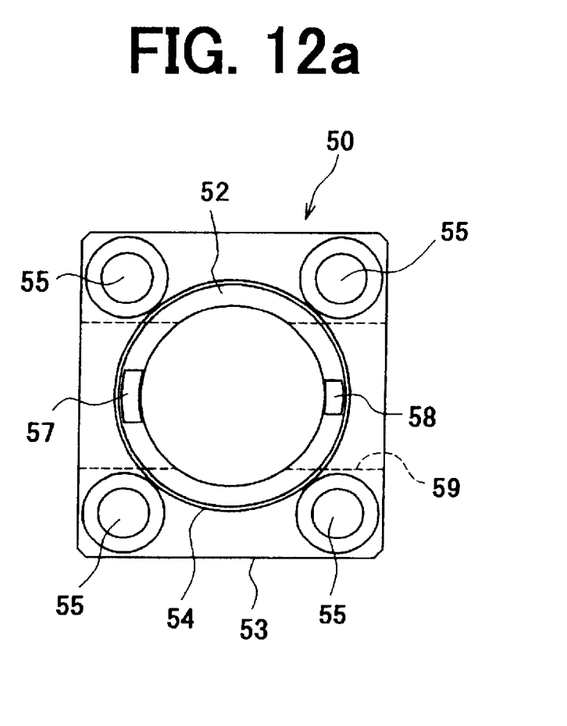
FIG. 12a is a plan view of a supporting base.
Figure 12B:
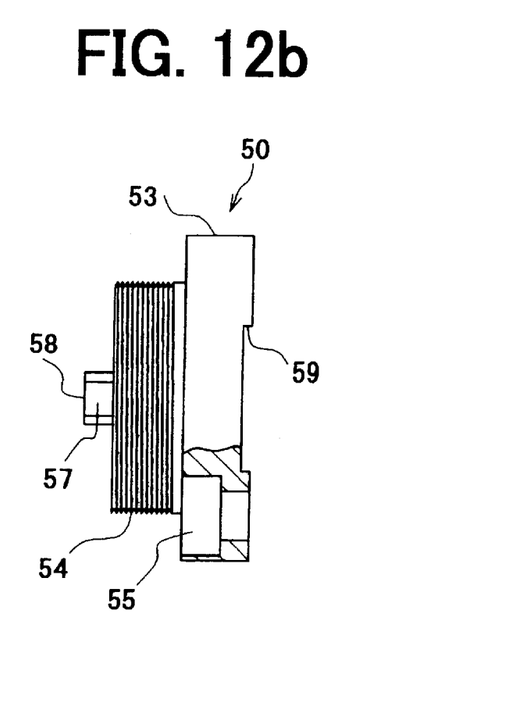
FIG. 12b is a right side view of the supporting base.
Figure 12C:
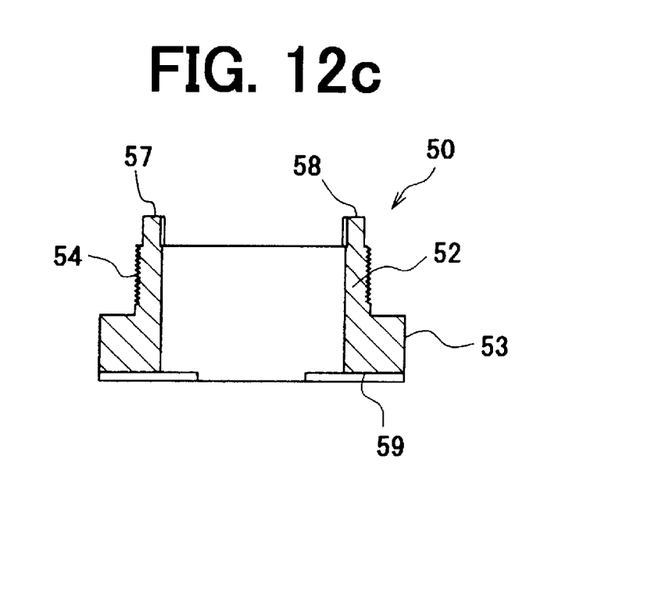
FIG. 12c is a sectional view of the supporting base.

As shown in FIGS. 12a to 12c, the supporting base 50 comprises a square flange 53 and a cylindrical portion 52 formed on the flange 53. A screw thread 54 is formed on the periphery of the cylindrical portion 52. Referring to FIG. 6, at the four corners of the flange 53, screw inserting holes 55 are formed corresponding to threaded holes 56 of the ribs 35 of the base 10. The cylindrical portion 52 is provided so that the body 15 can be inserted therein and the cylindrical portion 16 is fitted in the inside wall of the cylindrical portion 52. A pair of positioning projections 57 and 58 are formed on the top of the cylindrical portion 52 at opposite positions.

In the underside of the supporting base 50, a positioning recess 59 is formed. The positioning recess 59 is to be engaged with the positioning engaging portion 38 of the intermediate passage block 11 and with the positioning engaging portion 44 of the end passage block 12.

As shown in FIG. 6, a holding member 63 is attached to the underside of the body 15, and a metal gasket 64 (FIG. 3) is held on the bottom of the holding member 63. Each gasket 64 of the filter unit 3, regulator 4, pressure transducer 5, automatic diaphragm valve 6, and purge valve 7 has a pair of holes 65 and 66.

Referring to FIGS. 5 and 7, the installing devices 14 of the mass flow controller 8 are symmetrically provided. Each installing device 14 comprises a pair of pillars 67, a cramping block 68 and a screw 69. The pillar 67 has a screw thread 70 at a lower portion thereof, a head 71, an intermediate portion 72 and a supporting portion 73 having a small diameter.

The cramping block 68 has a pair of grooves 75, each to be engaged with the supporting portion 73, a pair of projections 76 formed on both sides of the groove 75 which are to be engaged with the head 71, and a threaded hole 77 at a central portion of the cramping block 68.

Referring to FIG. 5, holding members 78 are attached to the underside of the projecting blocks 26 and 27, and a metal gasket 79 having a hole 80 is held on each holding member 78.

The assembling of equipments of the control device will be described hereinafter. The body 15 and the union nut 51 of the toggle type manual diaphragm valve 2, pressure transducer 5, automatic diaphragm valve 6, purge valve 7 and automatic diaphragm valve 9 are engaged with each other before the body 15 is coupled in the function portion of each equipment.

In the device of the filter unit 3 and regulator 4, the union nut 51 is engaged with the body 15 from the bottom of the body. Thereafter, a stopping nut 61 is engaged with a screw thread of the body 15.

As shown in FIGS. 2 to 8, end passage blocks 12 are detachably engaged in both ends of the groove 36 of the base 10, projecting the screw threads 46. The intermediate passage blocks 11 and 11a are detachably engaged in the groove 36 between the end passage blocks 12.

Referring to FIG. 6, the square flange 53 of the supporting base 50 is mounted on the end passage block 12 and intermediate passage block 11, engaging the positioning recess 59 with side walls of the blocks 11 and 12, and engaging the opposite side walls of the flange 53 with the side walls of the positioning projections 37 and 43. Screws 60 are engaged with the threaded holes 56 of the base 10, passing through the holes 55 of the flange 53. Thus, the flange 53 and adjacent blocks 11 and 12 are secured to the base 10.

Other flanges 53 for the filter unit 3, regulator 4 and others are similarly secured to the base, interposing adjacent intermediate passage blocks 11.

Referring to FIGS. 3 to 6, the body 15 is inserted in the cylindrical portion 52 of the supporting base 50, engaging the positioning notches 23 and 24 of the body 15 with the positioning projections 57 and 58. Next, the union nut 51 is engaged with the screw thread 54 of the cylindrical portion 52 of the base 50 and engaged with the flange 22 of the body 15 to press the body against the adjacent passage blocks 11, thereby installing each gas control equipment on the base 10.

At the position, the first and second gas passages 18 and 19 communicate with gas passages 40 and 47 of adjacent blocks 11 and 12. At intermediate equipment, gas passages 18 and 19 communicate with gas passages 40 and 40 of adjacent blocks 11 and 11. The cylindrical portion 16 of the body 15 engages with the arcuated walls of positioning engaging portions 38 and 44. Each of the projections 20, 21, 41, 48 and 49 is pressed against the gasket 64 by the union nut 51. Thus, the sealing of the opening of each passage is ensured.

The mass flow controller 8 is assembled as follows.

Referring to FIGS. 5 and 7, the mass flow controller 8 is engaged with the groove 36 of the base 10 between the intermediate passage blocks 11a. The projecting blocks 26 and 27 are mounted on the mounting surface 42 of the blocks 11a, so that the mass flow controller 8 is positioned. The metal gasket 79 is engaged in the annular recess 39a of the passage block 11a. Pillars 67 are engaged with threaded holes 74 of the ribs 35 at the screw threads 70. Opposite pillars 67 nip the engaging portions 28 of the projecting blocks 26 and 27. Each cramping block 68 engages with the supporting portions 73 of the pillar 67 at the grooves 75. The screw 69 is engaged with the threaded hole 77.

As shown in FIG. 5, a spherical end 81 of the screw 69 engages with a spherical recess 82 of the projecting block 26 (27). Under the engaging condition, the screw 69 is further rotated, so that the cramping block 68 rises and the projections 76 abut the jaw of the head 11. Thus, the cramping block 68 is fixed to the pillars 67. By strongly rotating the screw 69, the projecting block 26 (27) is downwardly bent so that circular sealing projections 33, 34 and 41 are pressed against the metal gasket 79, thereby ensuring the sealing of the hole 80. In the assembled condition, gas passages 40 communicate with the first and second gas passages 31 and 32.

Thus, the gas control device 1 is assembled as shown in FIGS. 1 and 2. A plurality of gas control devices are arranged in parallel to provide an integrated gas control device. The left side end passage block 12 is connected to a gas supply source at the screw thread 46, and the right side end passage block 12 is connected to a manufacturing system.

By operating respective gas control equipments of the control device, it is possible to exactly and stably control the pressure, flow rate, mixing of high purity gas such as nitrogen gas, hydrogen gas, monosilane, hydrogen dilution phosphine, nitrogen dioxide, chloride fluoride.

In order to exchange one of the gas control equipments, such as the manual diaphragm valve 2, the equipment can be removed from the base 50 by taking out the union nut 51 together with the metal gasket 64 from the base 50. A new equipment is attached to the base 50 in the above described method.

In order to exchange the mass flow controller 8, the screws 69 are loosened to remove the projecting blocks 26 and 27, and to lower the cramping blocks 68 to remove from the heads 71 of the pillars 67. Thereafter, each of the cramping blocks 68 is taken out from the pillar 67 and the mass flow controller 8 is moved together with the metal gaskets 79 from the intermediate passage blocks 11a. A new mass flow controller is attached to the passage blocks 11a in the above described manner.

As described, each equipment is exchanged with a new equipment as a unit without decomposing. Therefore, the workability of the exchange is increased.

In order to remove the equipment such as the manual diaphragm valve 2 together with the base 50, screws 60 are taken off from the base 10 (FIG. 6), so that the base 50 can be removed from the base 10 together with the metal gasket 64. A new base and equipment are attached on the base 10 and intermediate passage blocks 11 in the above described manner. It is possible to exchange the equipment with another equipment having a function different from the old equipment.

In order to replace the intermediate passage block 11 or 11a, it is necessary to take off adjacent equipments.

In the device of the present invention, gas passage 47 of each of the passage blocks 11, 11a and 12a is opened at the upper surface of the block and communicated with the gas passage 18 or 19, or 31 or 32. Consequently, it is not necessary to connect passage blocks with each other. Therefore, the length of the gas line can be reduced.

Since each of the passage blocks 11, 11a and 12 is securely mounted on the base 10 by the base 50 or block 26 or 27, it is not necessary to independently secure the block 11, 11a or 12 to the base 10, which renders the assembling of the device easy and causes the time of the assembling to reduce.

Since the union nut 51 attached to the body 15 is engaged with the screw thread 54 formed on the periphery of the cylindrical portion 52 of the base 50, particles generated by the engagement of the union nut with the screw thread 54 are prevented from entering in the cylindrical portion 52.

The base 10 does not contact with gases. Therefore, the base can be made with aluminum, thereby reducing the weight of the device.

While the invention has been described in conjunction with preferred specific embodiment thereof, it will be understood that this description is intended to illustrate and not limit the scope of the invention, which is defined by the following claims.

What is claimed is:

1. An integrated gas control device comprising:

an elongated base having a pair of ribs longitudinally extending on the base to form a groove there-between;

a pair of end passage blocks mounted in the groove at both ends thereof, each of the end passage blocks having a gas passage having an opening opened at an upper surface at an inner portion of the block;

intermediate passage blocks mounted in the groove between the end passage blocks, each of the intermediate passage blocks having a gas passage having openings opened at an upper surface at both ends of the block;

a plurality of gas control equipments, each of the gas control equipments being mounted on adjacent passage blocks, and having a pair of gas passages having openings communicated with the gas passages of the adjacent passage blocks;

a plurality of installing devices, for installing the gas control equipments on the base, respectively.

2. The gas control device according to claim 1 wherein the gas passage of each of the end passage blocks has an opening at an axial end side.

3. The gas control device according to claim 2 wherein each of the end passage blocks has a screw thread at an axial end to be connected with another device.

4. The gas control device according to claim 1 wherein at least one of the gas control equipments has a body mounted on the adjacent passage blocks, and the body has a pair of gas passages communicated with gas passages of the adjacent passage blocks.

5. The gas control device according to claim 4 wherein the body has a flange, at least one of the installing devices comprises a supporting base having a cylindrical portion having a screw thread formed on the cylindrical portion, and secured to the base, and a union nut engaged with the screw thread and engaged with the flange of the body so that the body is pressed against adjacent passage blocks.

6. The gas control device according to claim 1 wherein each of the openings of the gas passages is surrounded by an annular projection.

7. The gas control device according to claim 6 wherein opposite openings are disposed interposing a metal gasket.

8. The gas control device according to claim 1 wherein at least one of the installing devices comprises a supporting base having a cylindrical portion having a screw thread formed on the cylindrical portion, and secured to the base, and a union nut engaged with the screw thread for installing the gas control equipment.

9. The gas control device according to claim 1 wherein one of the gas control equipments has a pair of projecting blocks mounted on adjacent passage blocks, and each of the projecting blocks has a gas passage communicated with the gas passage of the corresponding passage block.

10. The gas control device according to claim 9 further comprising four pillars, each of the pillars having a screw thread at a lower portion and engaged with threaded holes formed in the ribs for nipping the projecting blocks.

11. The gas control device according to claim 10 further comprising a pair of cramping blocks, each of the cramping blocks being mounted on the opposite pillars for pressing the projecting blocks against the adjacent passage blocks.

12. The gas control device according to claim 11 wherein each of the pillars has a supporting portion having a smaller diameter than that of the body portion of the pillar and a head at an upper end of the supporting portion, each of the cramping blocks has a pair of grooves slidably engaged with the supporting portion, and a threaded hole in which a screw is engaged, the cramping block is pressed against a jaw of the head and a lower end of the screw is pressed against the projecting block.

* * * * *